United States Patent
Hong (10) Patent No.: US 8,279,364 B2
(45) Date of Patent: *Oct. 2, 2012

(54) LIQUID CRYSTAL DISPLAY DEVICE

(75) Inventor: Jin Cheol Hong, Kumi (KR)

(73) Assignee: LG Display Co., Ltd., Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 12/379,545

(22) Filed: Feb. 24, 2009

(65) Prior Publication Data

US 2009/0167972 A1     Jul. 2, 2009

Related U.S. Application Data

(62) Division of application No. 10/811,141, filed on Mar. 29, 2004, now Pat. No. 7,511,791.

(30) Foreign Application Priority Data

Mar. 28, 2003  (KR) .................. 10-2003-0019532

(51) Int. Cl.
*G02F 1/1343* (2006.01)

(52) U.S. Cl. ........................... 349/38; 349/139

(58) Field of Classification Search .......... 349/139, 349/143, 37–43

See application file for complete search history.

(56) References Cited

U.S. PATENT DOCUMENTS

| | | | |
|---|---|---|---|
| 4,969,718 A | 11/1990 | Noguchi et al. | |
| 6,327,008 B1 | 12/2001 | Fujiyoshi | |
| 6,356,320 B1 * | 3/2002 | Chung et al. | 349/54 |
| 6,559,904 B1 * | 5/2003 | Kwak et al. | 349/43 |
| 6,633,360 B2 * | 10/2003 | Okada et al. | 349/145 |
| 6,862,052 B2 | 3/2005 | Kim | |
| 7,428,035 B2 * | 9/2008 | Kim et al. | 349/161 |
| 7,511,791 B2 * | 3/2009 | Hong | 349/139 |

FOREIGN PATENT DOCUMENTS

| | | |
|---|---|---|
| KR | 10-2002-0058141 | 7/2002 |
| KR | 1020030095762 | 12/2003 |
| KR | 10-1999-0079263 | 6/2006 |

OTHER PUBLICATIONS

Bartley et al. (2001), "Dimension Analysis of an Open-ended Coaaxial-Line Probe", IEEE Instrumentation and Measurement Technology Conference, May 21-23, 2001: 478-481.

* cited by examiner

*Primary Examiner* — Dung T. Nguyen (74) *Attorney, Agent, or Firm* — McKenna Long & Aldridge LLP (57) ABSTRACT

A liquid crystal display device for eliminating a vertical dimming phenomenon to improve a picture quality of a liquid crystal display panel is disclosed. In the device, first and second data lines are supplied with data. A first pixel electrode is spaced at a desired distance from the first data line. A second pixel electrode is spaced, by a distance different from said distance between the first data line and the first pixel electrode, from the second data line.

12 Claims, 11 Drawing Sheets

FIG.1A
RELATED ART

| | R | G | B | R | G | B | R | G | B | R | G | B |
|---|---|---|---|---|---|---|---|---|---|---|---|---|
| | + | + | − | − | + | + | − | − | + | + | − | − |
| | − | − | + | + | − | − | + | + | − | − | + | + |
| | + | + | − | − | + | + | − | − | + | + | − | − |
| | − | − | + | + | − | − | + | + | − | − | + | + |

[ODD FRAME]

FIG.1B
RELATED ART

| | R | G | B | R | G | B | R | G | B | R | G | B |
|---|---|---|---|---|---|---|---|---|---|---|---|---|
| | − | − | + | + | − | − | + | + | − | − | + | + |
| | + | + | − | − | + | + | − | − | + | + | − | − |
| | − | − | + | + | − | − | + | + | − | − | + | + |
| | + | + | − | − | + | + | − | − | + | + | − | − |

[EVEN FRAME]

LIQUID CRYSTAL DISPLAY DEVICE

This is a Divisional Application of U.S. patent application Ser. No. 10/811,141, filed on Mar. 29, 2004 now U.S. Pat. No. 7,511,791; which claims priority of Korean Patent Application No. P2003-19532, filed on Mar. 28, 2003, all of which are incorporated herein by reference in their entirety.

BACKGROUND OF THE INVENTION

1. Field of the Invention

This invention relates to a liquid crystal display, and more particularly to a liquid crystal display that is adapted to eliminate a vertical dimming phenomenon to improve a picture quality of a liquid crystal display panel.

2. Description of the Related Art

Generally, a liquid crystal display (LCD) controls the light transmittance of a liquid crystal using an electric field to thereby display a picture. To achieve this, the LCD includes a liquid crystal display panel having liquid crystal cells arranged in a matrix, and a driving circuit for driving the liquid crystal display panel. In the liquid crystal display panel, gate lines and data lines cross each other and liquid crystal cells are provided at areas defined by such crossings of the gate lines with the data lines. The liquid crystal display panel is provided with transparent pixel electrodes and a common electrode for applying an electric field to the liquid crystal cells. Each pixel electrode is connected, via source and drain terminals of a thin film transistor (TFT) as a switching device, to any one of the data lines. The gate terminal of the TFT is connected to any one of the gate lines. Accordingly, the LCD controls the light transmittance by an electric field applied between the pixel electrode and the common electrode in response to a data voltage signal supplied for each liquid crystal cell, to display a picture.

Such an LCD uses inversion driving schemes, such as a frame inversion system, a line (or column) inversion system and a dot inversion system, in order to drive the liquid crystal cells in the liquid crystal display panel. The frame inversion system inverts the polarities of data signals applied to the liquid crystal cells in the liquid crystal display panel whenever a frame is changed. The line inversion system inverts the polarities of data signals applied to the liquid crystal cells in accordance with the lines (or columns) on the liquid crystal display panel. The dot inversion system allows data signals having polarities contrary to that of the data signals applied to the liquid crystal cells adjacent to each other in the vertical and horizontal directions to be applied to the liquid crystal cells in the liquid crystal display panel, and allows the polarities of data signals applied to all the liquid crystal cells in the liquid crystal display panel to be inverted every frame. The dot inversion system of such inversion driving schemes provides a picture having a better picture quality than that of the frame and line inversion systems.

Typically, such an LCD is driven with a frame frequency of 60 Hz. However, a system requiring low power consumption such as a notebook personal computer requires lowering the frame frequency from 50 to 30 Hz. Since the dot inversion system capable of providing an excellent picture quality described with reference to the above-mentioned inversion systems also generates a flicker as the frame frequency decreases a liquid crystal display panel driving method having a horizontal 2-dot inversion system as shown in FIG. 1A and FIG. 1B.

Figure 1A:
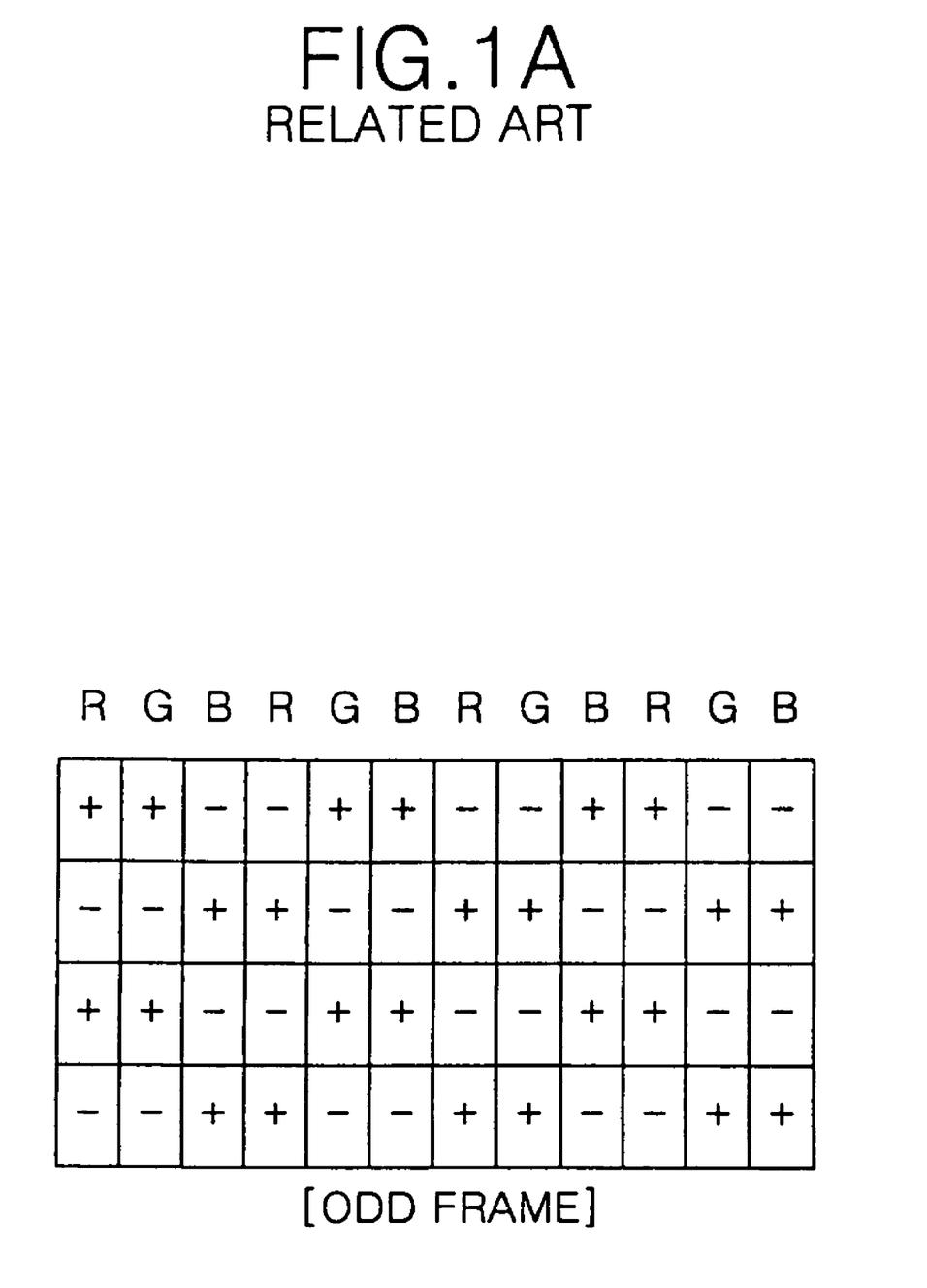
FIG. 1A and FIG. 1B depict data polarity patterns in a horizontal 2-dot inversion system applied to a related art liquid crystal display panel.
Figure 1B:
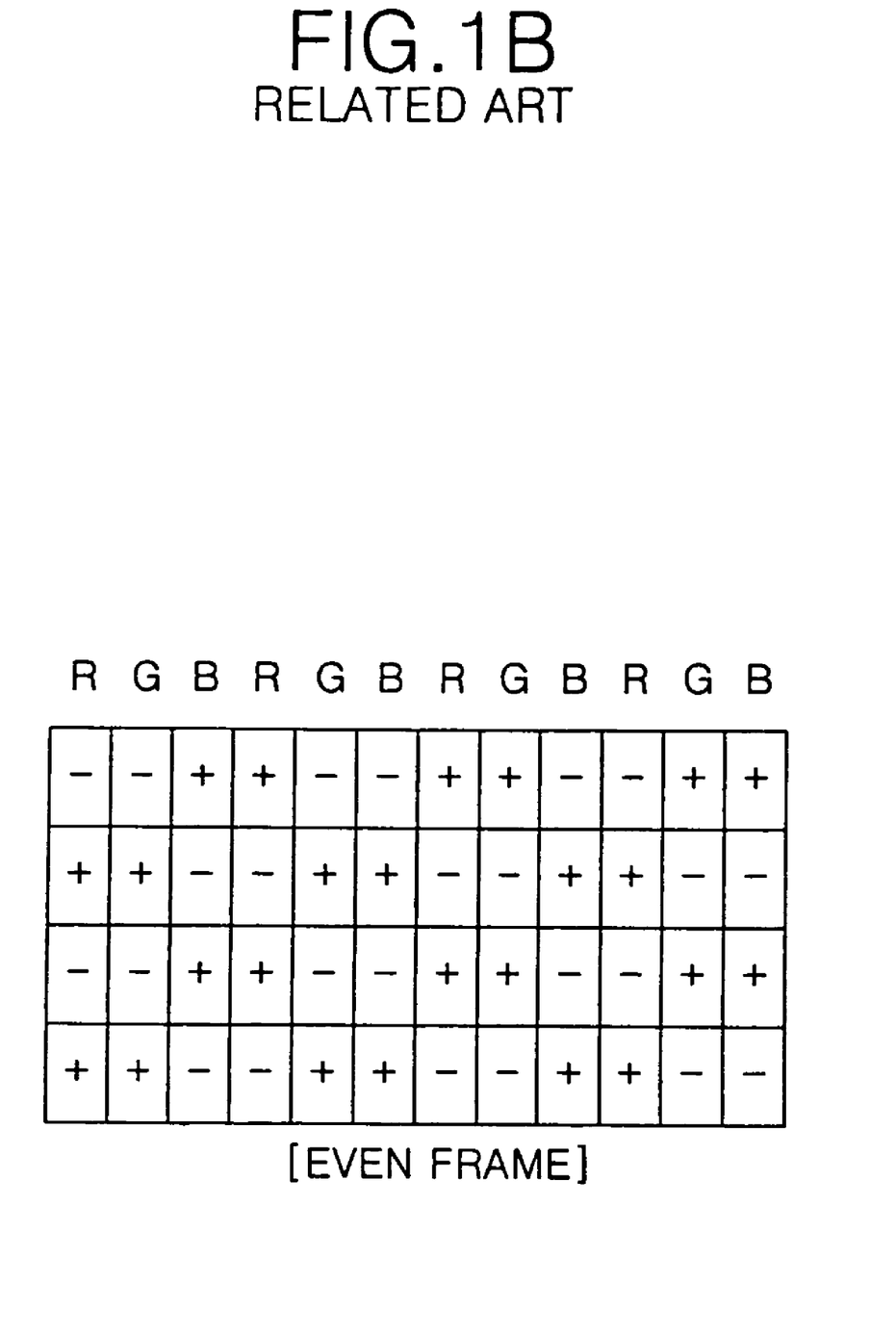

Referring to FIG. 1A and FIG. 1B, there are shown data polarity patterns applied to the liquid crystal cells in the liquid crystal display panel by the liquid crystal display panel driving method employing the horizontal 2-dot inversion system, which are divided into odd frames and even frames, respectively. With respect to the odd frames shown in FIG. 1A and the even frames shown in FIG. 1B, the data polarity pattern in the horizontal 2-dot inversion driving system is changed for each two liquid crystal cells, that is, for each two dots in the horizontal direction while being changed for each one dot in the vertical direction.

If such a horizontal 2-dot inversion system is used, then a phenomenon that DC voltage concentrates on the data line from almost a majority of the screen is eliminated because an identical period between colors of red (R), green (G) and blue (B) pixels and data polarity patterns becomes 12 dots in the horizontal direction, thereby reducing a flicker. However, a use of the horizontal 2-dot inversion system causes a brightness difference between odd-numbered lines and even-numbered lines of the data lines from the gray field, thereby generating a vertical dimming phenomenon.

The above-mentioned vertical dim caused by the horizontal 2-dot inversion driving is generated by a parasitic capacitance between the data line and the pixel electrode. This will be described in detail in conjunction with FIG. 2 below.

Figure 2:
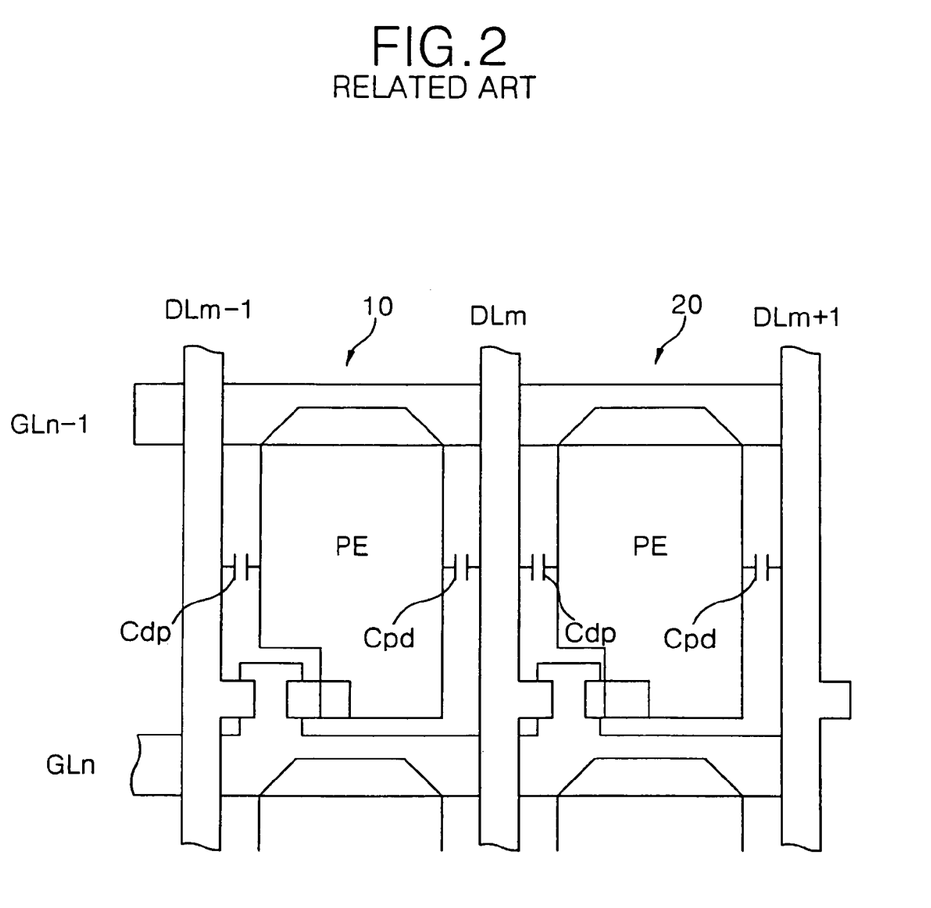
FIG. 2 is a schematic view illustrating a liquid crystal cell configuration of a related art liquid crystal display device.
Figure 3:
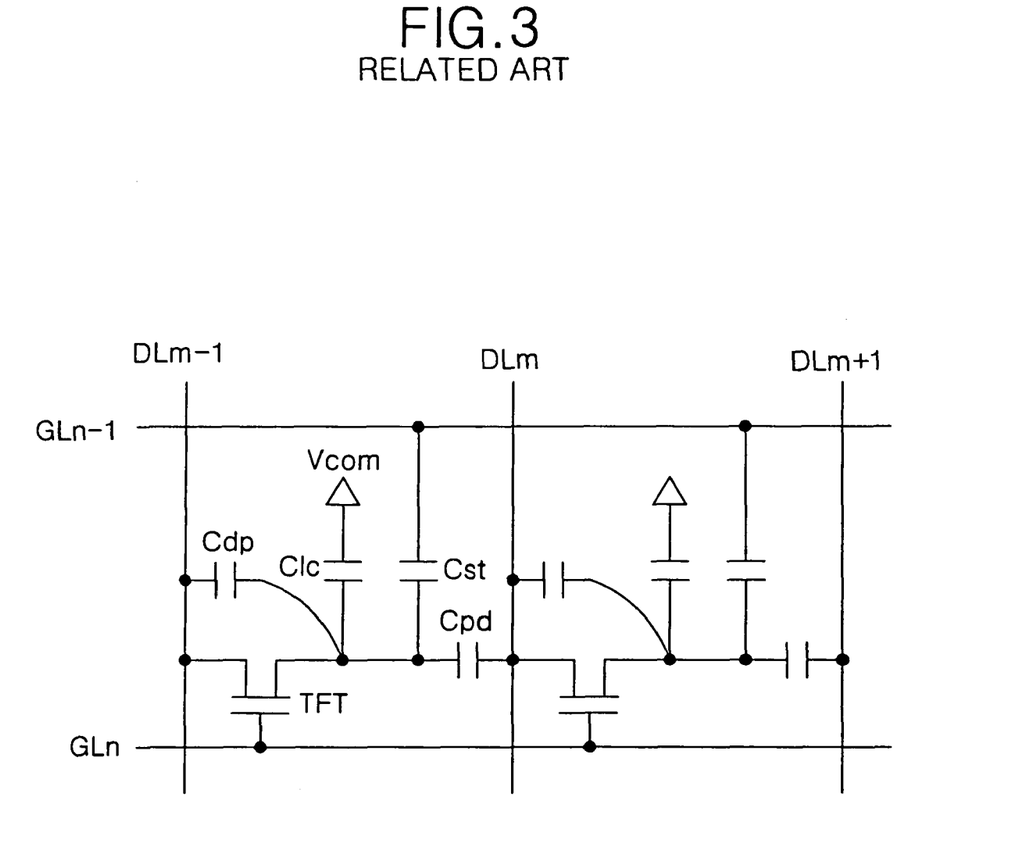
FIG. 3 is an equivalent circuit diagram of the liquid crystal cell illustrated in FIG. 2.

Referring to FIG. 2 and FIG. 3, a liquid crystal cell of the conventional LCD includes thin film transistors TFT provided at crossings between data lines DL and gate lines GL, and pixel electrodes PE connected to common electrodes Vcom and the thin film transistors TFT opposed to each other with having a liquid crystal therebetween.

The thin film transistor TFT has a gate electrode connected to the gate line GL, a source electrode connected to the data line DL and a drain electrode connected to the pixel electrode PE. The thin film transistor TFT is turned on when a scanning signal, that is, a gate high voltage Vgh from the gate line GL, is applied, to thereby supply the liquid crystal cell with a pixel signal from the data line DL. Further, the thin film transistor TFT is turned off when a gate low voltage Vgl from the gate line GL is applied, to thereby maintain a pixel signal charged in the liquid crystal cell.

The liquid crystal cell further includes a storage capacitor Cst in order to maintain the charged pixel electrode PE until the next pixel signal is charged. This storage capacitor Cst is provided between the pixel electrode PE and the pre-stage gate line GLn−1. Such a liquid crystal cell varies an alignment state of a liquid crystal cell in response to a pixel signal charged via the thin film transistor TFT for the purpose of controlling a light transmittance, thereby implementing a gray level.

As shown in FIG. 3, the liquid crystal cell can be equivalently expressed as a liquid crystal capacitor Clc, which generates a parasitic capacitance because it is adjacent to the data line DL and the pixel electrode PE. In this case, the parasitic capacitance includes a first parasitic capacitance Cdp between the left data line DLm−1 and the pixel electrode PE, and a second parasitic capacitance Cpd between the pixel electrode PE and the left data line DLm. Each of the first and second parasitic capacitance Cdp and Cpd causes a voltage variation in the data line and a capacitance coupling after a pixel signal is charged in the liquid crystal cell, thereby varying a voltage of the liquid crystal cell.

Figure 4:
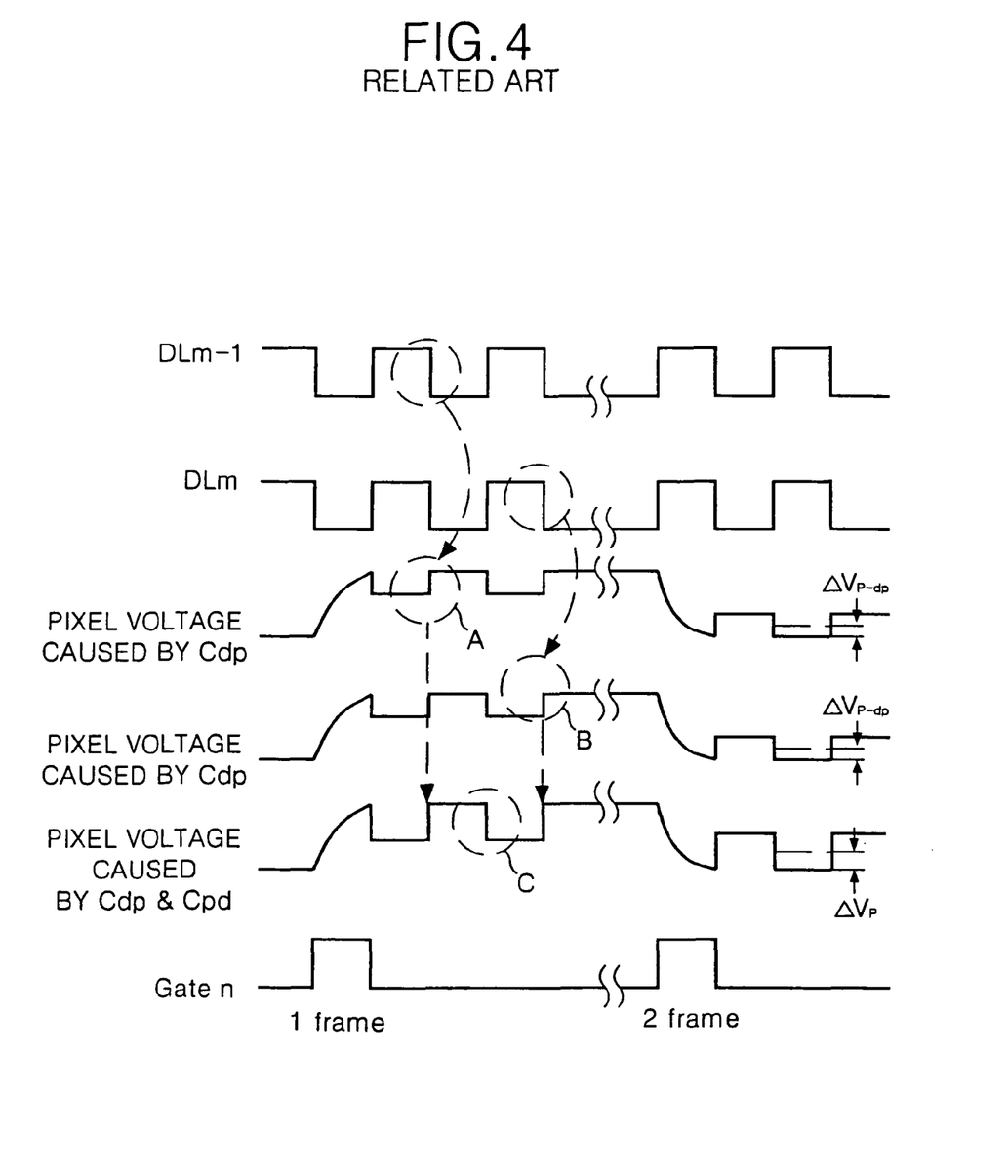
FIG. 4 is a waveform diagram representing a variation in a pixel voltage caused by a parasitic capacitance of the liquid crystal cell shown in FIG. 3.

In other words, if the liquid crystal cell is driven by the horizontal 2-dot inversion system, then two pixels having the same data polarity pattern of the data signal differ by an average variation value ΔVp–dp of a pixel voltage A caused by a capacitance coupling of the first parasitic capacitance Cdp from an average variation value ΔVp–pd of a pixel voltage B caused by a capacitance coupling of the second parasitic capacitance Cpd, as shown in FIG. 4, with respect to a left pixel 10 and a light pixel 20.

In this case, an average variation value ΔVp–dp of a pixel voltage A caused by a capacitance coupling of the first parasitic capacitance Cdp or an average variation value ΔVp–pd of a pixel voltage B caused by a capacitance coupling of the second parasitic capacitance Cpd can be expressed by the following equation:

$$\Delta Vp(Cdp \text{ or } Cpd) = \{Cdp \times \Delta V(DL_m-1) + Cpd \times \Delta V(DL_m)\} \div C_{total} \qquad (1)$$

wherein $C_{total}$ represents total capacitance of the pixel electrode PE.

Accordingly, at the right pixel 20, the values are cancelled with respect to each other like the dot inversion driving system. On the other hand, at the left pixel 10, an average variation value ΔVp–dp of a pixel voltage A caused by a capacitance coupling of the first parasitic capacitance Cdp is added to an average variation value ΔVp–pd of a pixel voltage B caused by a capacitance coupling of the second parasitic capacitance Cpd at the left pixel 10 without being cancelled. Thus, average variation values of the pixel voltages caused by the capacitance couplings at the left pixel 10 and at the light pixel 20 become different from each other.

Figure 5:
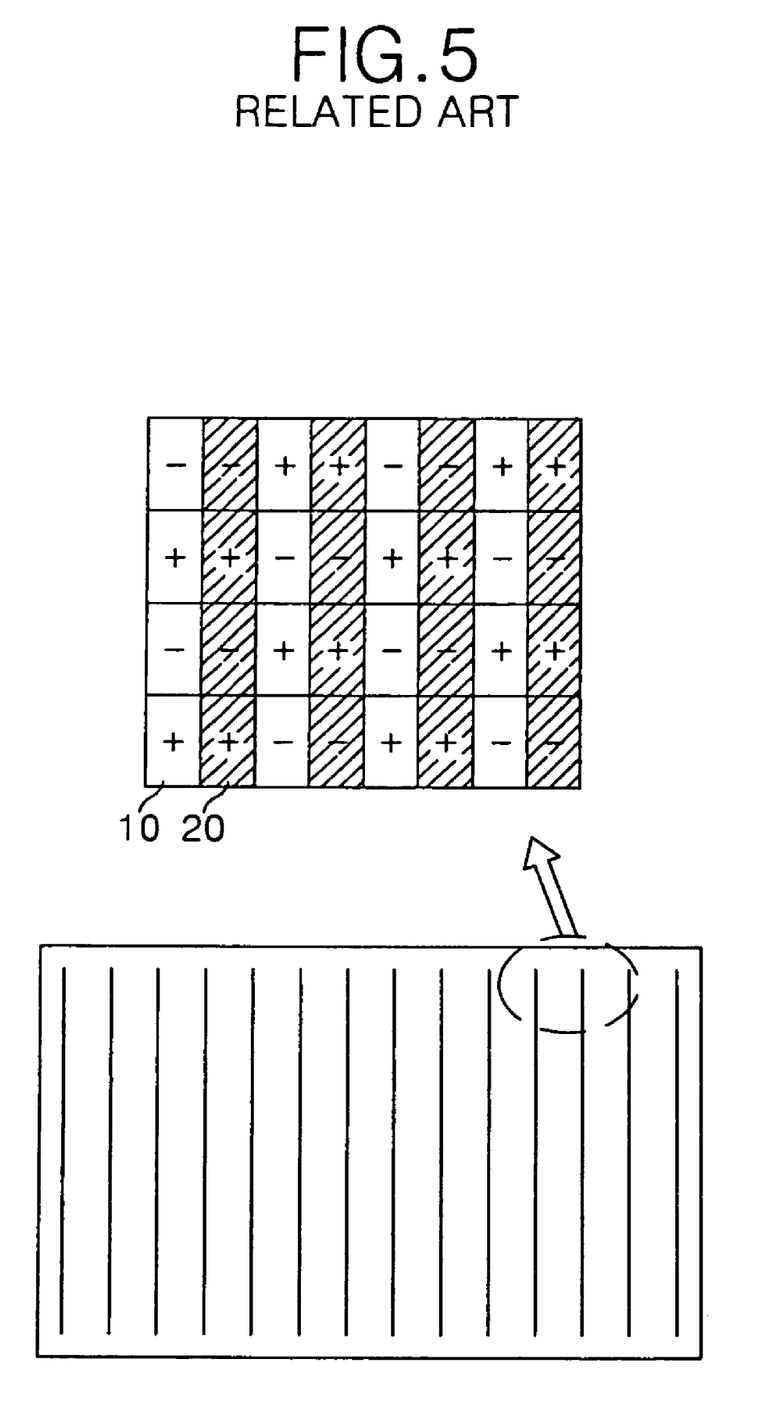
FIG. 5 depicts a vertical dim phenomenon displayed on the liquid crystal display panel by a capacitance coupling effect caused by the data line and the parasitic capacitance shown in FIG. 3.

Consequently, when the first parasitic capacitance Cdp is equal to the second parasitic capacitance Cpd, an effective value of the pixel voltage at the left pixel 10 becomes two times of ΔVp–dp in comparison with that at the light pixel 20. In this case, an effective value variation in the pixel voltage increases when the pixel voltage has a positive level, whereas an effective value variation in the pixel voltage decreases when the pixel voltage has a negative level. Accordingly, there occurs a phenomenon that the right pixel 20 becomes brighter than the left pixel 10 as shown in FIG. 5. As a result, the LCD employing the horizontal 2-dot inversion driving system generates a vertical dim (or vertical line) from the liquid crystal display panel.

SUMMARY OF THE INVENTION

Accordingly, the present invention is directed to a liquid crystal display device that substantially obviates one or more of the problems due to limitations and disadvantages of the related art.

It is an advantage of the present invention to provide a liquid crystal display that is adaptive for eliminating a vertical dim phenomenon to improve a picture quality of a liquid crystal display panel.

In order to achieve these and other advantages of the invention, a liquid crystal display device according to an embodiment of the present invention includes first and second data lines supplied with data; a first pixel electrode spaced at a desired distance from the first data line; and a second pixel electrode spaced, by a distance different from said distance between the first data line and the first pixel electrode, from the second data line.

In the liquid crystal display device, the second pixel electrode has a larger dimension that the first pixel electrode.

The first and second pixel electrodes are supplied with data having the same polarity.

Said data have data polarity patterns inverted for each two pixel electrodes in the horizontal direction while having data polarity patterns inverted for each one pixel electrode in the vertical direction.

Herein, a parasitic capacitance between the second pixel electrode and the second data line has at least three times larger value than a parasitic capacitance between the first pixel electrode and the first data line.

A liquid crystal display device according to another embodiment of the present invention includes a first data line supplied with data; and a second data line supplied with said data and having a different width from the first data line.

The liquid crystal display device further includes a first pixel electrode spaced at a desired distance from the first data line; and a second pixel electrode spaced at a desired distance from the second data line.

In the liquid crystal display device, the first pixel electrode has the same dimension as the second pixel electrode.

The first and second pixel electrodes are supplied with data having the same polarity.

Said data have data polarity patterns inverted for each two pixel electrodes in the horizontal direction while having data polarity patterns inverted for each one pixel electrode in the vertical direction.

Herein, a parasitic capacitance between the second pixel electrode and the second data line has at least three times larger value than a parasitic capacitance between the first pixel electrode and the first data line.

A liquid crystal display device according to still another embodiment of the present invention includes a first data line supplied with data; a second data line supplied with said data and being in parallel to the first data line; and a protrusion electrode protruded from the second data line.

The liquid crystal display device further includes a first pixel electrode spaced at a desired distance from the first data line; and a second pixel electrode spaced at a desired distance from the second data line and overlapped with the protrusion electrode at a portion thereof.

In the liquid crystal display device, the first pixel electrode has the same dimension as the second pixel electrode.

The first and second pixel electrodes are supplied with data having the same polarity.

Said data have data polarity patterns inverted for each two pixel electrodes in the horizontal direction while having data polarity patterns inverted for each one pixel electrode in the vertical direction.

Herein, a parasitic capacitance between the second pixel electrode and the second data line and a parasitic capacitance between the protrusion electrode and the second pixel electrode have at least three times larger value than a parasitic capacitance between the first pixel electrode and the first data line.

A liquid crystal display device according to still another embodiment of the present invention includes first and second data lines supplied with data; a first pixel electrode spaced at a desired distance from the first data line; a second pixel electrode spaced at a desired distance from the second data line; and a protrusion electrode protruded from the second pixel electrode into the second data line and overlapped at a portion thereof.

In the liquid crystal display device, the first pixel electrode has the same dimension as the second pixel electrode.

The first and second pixel electrodes are supplied with data having the same polarity.

Said data have data polarity patterns inverted for each two pixel electrodes in the horizontal direction while having data polarity patterns inverted for each one pixel electrode in the vertical direction.

Herein, a parasitic capacitance between the second pixel electrode and the second data line and a parasitic capacitance between the protrusion electrode and the second pixel electrode have at least three times larger value than a parasitic capacitance between the first pixel electrode and the first data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, example of which is illustrated in the accompanying drawings.

Figure 6:
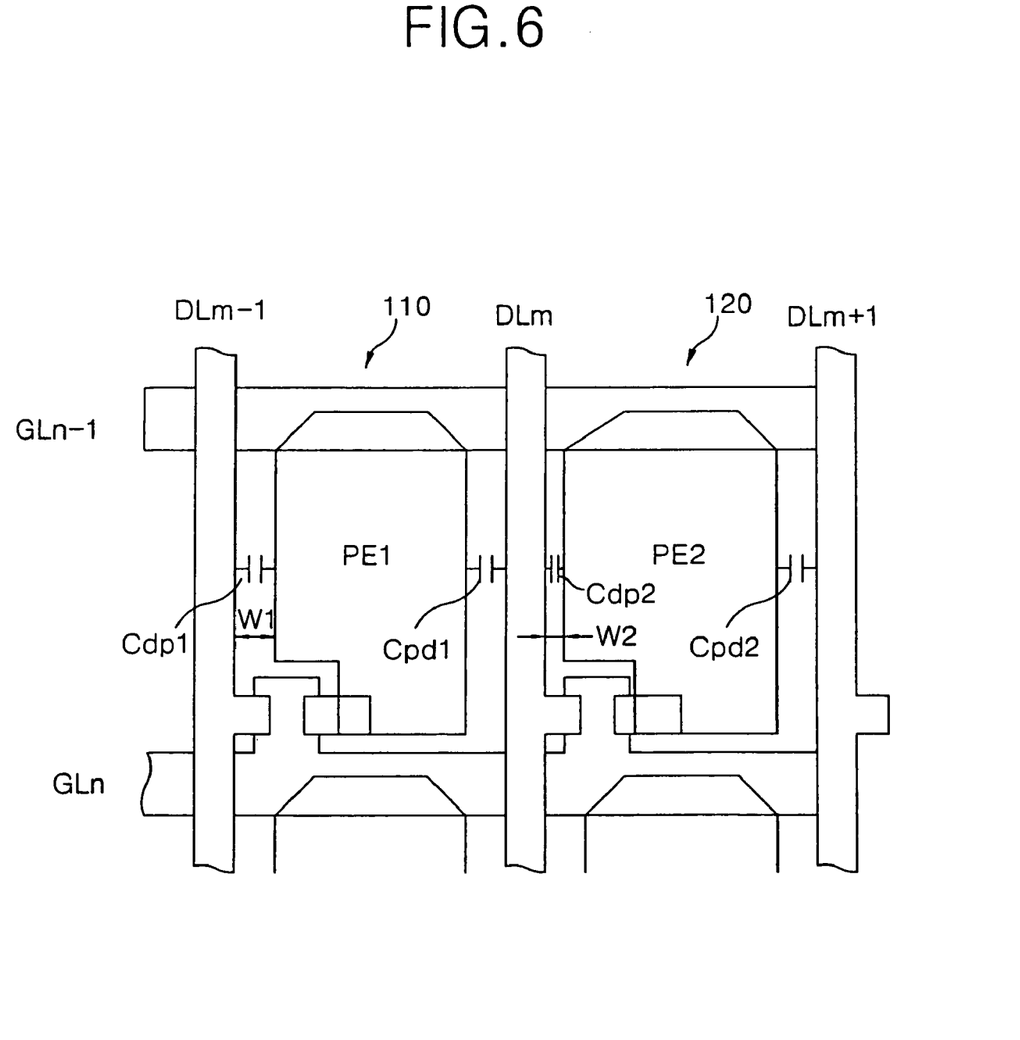
FIG. 6 is a schematic diagram illustrated a liquid crystal cell configuration having an asymmetrical pixel electrode in a liquid crystal display device according to a first embodiment of the present invention.
Figure 7:
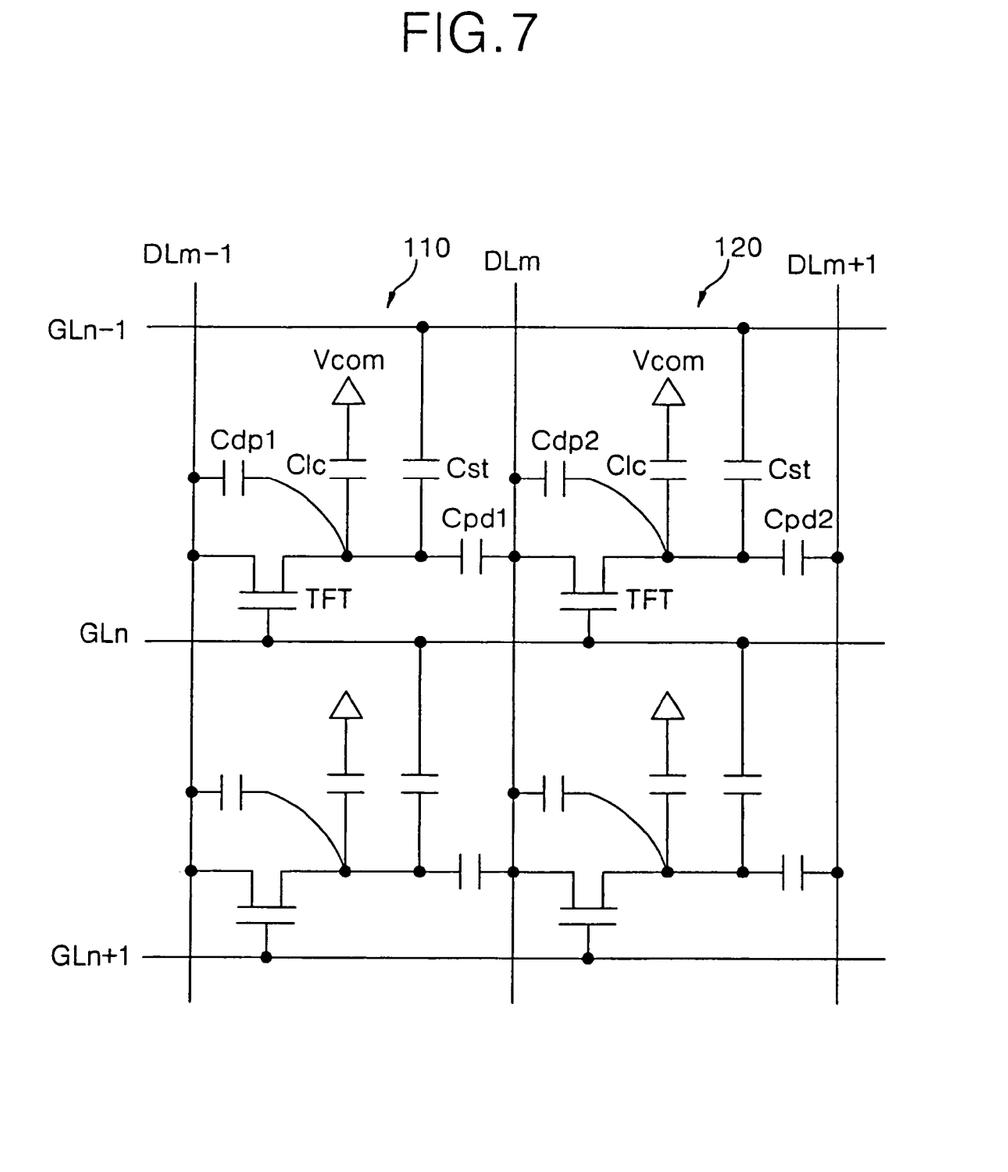
FIG. 7 is an equivalent circuit diagram of the liquid crystal cell illustrated in FIG. 6.

Referring to FIG. 6 and FIG. 7, a liquid crystal cell of a liquid crystal display (LCD) according to a first embodiment of the present invention includes thin film transistors TFT provided at crossings between data lines DL and gate lines GL, and transparent pixel electrodes PE provided between adjacent data lines DL in such a manner to have a different distance from the data lines DL. The liquid crystal cell further includes a storage capacitor Cst in order to make a stable maintenance of the charged pixel electrode PE until the next pixel signal is charged.

The thin film transistor TFT has a gate electrode connected to the gate line GL, a source electrode connected to the data line DL and a drain electrode connected to the pixel electrode PE. The thin film transistor TFT is turned on when a scanning signal, that is, a gate high voltage Vgh from the gate line GL is applied, to thereby supply the liquid crystal cell with a pixel signal from the data line DL. Further, the thin film transistor TFT is turned off when a gate low voltage Vgl from the gate line GL is applied, to thereby maintain a pixel signal charged in the liquid crystal cell.

The pixel electrode PE is connected to a common electrode Vcom and the thin film transistor TFT that are opposed to each other with having a liquid crystal therebetween. Such a pixel electrode PE is comprised of a first pixel electrode PE1 spaced at a desired distance from the (m−1)th data line DLm−1, and a second pixel electrode PE2 spaced, by a distance different from the distance between the (m−1)th data line DLm−1 and the first pixel electrode PE1, from the mth data line DLm.

The first and second pixel electrodes PE1 and PE2 have a different size (or area) from each other. Herein, the second pixel electrode PE2 has a larger area than the first pixel electrode PE1.

The first pixel electrode PE1 is provided between the (m−1)th data line DLm−1 and the mth data line DLm such that a distance between one side thereof and the (m−1)th data line DLm−1 is equal to a distance between other opposite side thereof and the mth data line DLm. In this case, a parasitic capacitance is generated between the data line DL and the pixel electrode PE because they are structurally adjacent to each other. Such a parasitic capacitance causes a voltage variation in the data line and a capacitance coupling after a pixel signal was charged in the liquid crystal cell, thereby varying a pixel voltage of the liquid crystal cell. The parasitic capacitance is divided into a first parasitic capacitance Cdp1 generated between the (m−1)th data line and the first pixel electrode PE1 and a second parasitic capacitance Cpd1 generated between the first pixel electrode PE1 and the mth data line DLm.

The second pixel electrode PE2 is provided between the mth data line DLm and the (m+1)th data line DLm+1 such that a distance between one side thereof and the mth data line DLm is equal to a distance between other opposite side thereof and the (m+1)th data line DLm+1. In other words, one side of the second pixel electrode PE2 adjacent to the mth data line DLm is further extended into the mth data line DLm. In this case, a third parasitic capacitance Cdp2 is generated between the mth data line DLm and the second pixel electrode PE2 while a fourth parasitic capacitance Cpd2 is generated between the second pixel electrode PE2 and the (m+1)th data line DLm+1. Thus, the third parasitic capacitance Cdp2 is at least three times larger than the first parasitic capacitance Cdp1 of the first pixel electrode PE1. In other words, a distance W2 between one side of the second pixel electrode PE2 and the mth data line DLm becomes narrower than a width W1 between one side of the first pixel electrode PE1 and the (m−1)th data line DLm−1. Thus, the third parasitic capacitance Cdp2 is at least three times larger than the first parasitic capacitance Cdp1. On the other hand, the fourth parasitic capacitance Cpd2 has the same value as the first parasitic capacitance Cdp1.

The liquid crystal cell provided with the first and second pixel electrodes PE1 and PE2 is supplied with a data polarity pattern in the horizontal 2-dot inversion driving system that is changed every two liquid crystal cells, i.e., for each two dots in the horizontal direction while being changed for each one dot in the vertical direction. Accordingly, the first pixel electrode PE1 and the second pixel electrode PE2 are supplied with the same data polarity pattern.

As described above, when the liquid crystal cell is driven by the horizontal 2-dot inversion system, the LCD according to the first embodiment of the present invention allows the third parasitic capacitance Cdp2 at a right pixel 120, of two pixels having the same data polarity pattern, to be three times greater than the first parasitic capacitance Cdp1. Accordingly, at a left pixel 110, an effect caused by a capacitance coupling of the first parasitic capacitance Cdp1 is added to an effect caused by a capacitance coupling of the second parasitic capacitance Cpd1. On the other hand, at the right pixel 120, an effect caused by a capacitance coupling of the fourth parasitic capacitance Cpd2 is subtracted from an effect caused by a capacitance coupling of the third parasitic capacitance Cdp2, but an effect caused by the same capacitance coupling as the left pixel 110 only is left because an effect caused by a capacitance coupling of the third parasitic capacitance Cdp2 is relatively large. Thus, a deviation in the pixel voltage of the left pixel 110 and the right pixel 120 in the data polarity pattern is cancelled. Accordingly, the LCD according to the embodiment of the present invention does not generate a vertical dimming phenomenon caused by the parasitic capacitance between the data line and the pixel electrode in the related art.

Figure 8:
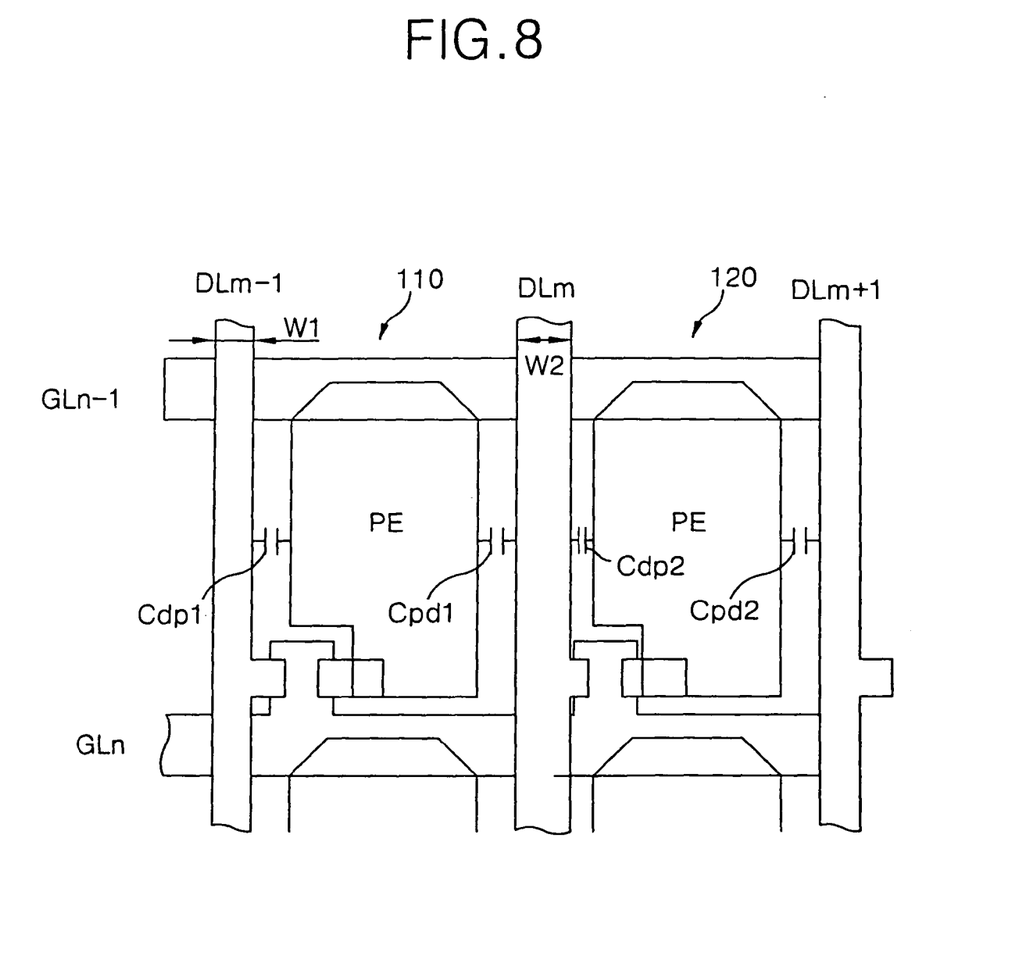
FIG. 8 is a schematic diagram illustrating a liquid crystal cell configuration of a liquid crystal display device according to a second embodiment of the present invention.

Referring to FIG. 8, a liquid crystal cell of a liquid crystal display (LCD) according to a second embodiment of the present invention includes thin film transistors TFT provided at crossings between data lines DL and gate lines GL having a different widths, and pixel electrodes PE connected to the thin film transistor TFT. The liquid crystal cell further includes a storage capacitor Cst in order to maintain the charged pixel electrode PE until the next pixel signal is charged.

The thin film transistor TFT has a gate electrode connected to the gate line GL, a source electrode connected to the data line DL and a drain electrode connected to the pixel electrode PE. The thin film transistor TFT is turned on when a scanning signal, that is, a gate high voltage Vgh from the gate line GL is applied, to thereby supply the liquid crystal cell with a pixel signal from the data line DL. Further, the thin film transistor TFT is turned off when a gate low voltage Vgl from the gate line GL is applied, to thereby maintain a pixel signal charge in the liquid crystal cell.

The data lines DL includes a first data line DLm−1 having a first width W1, and a second data line DLm having a second width W2 larger than the first width W1 and provided in parallel to the first data line DLm−1. The first and second data lines DLm−1 and DLm are repeatedly provided to have the same distance.

The pixel electrode PE is provided between the data lines DL and connected to the thin film transistor TFT.

At a left pixel 110 provided at the left side around the second data line DLm in the liquid crystal cell, a first parasitic capacitance Cdp1 is generated between the first data line DLm−1 and the pixel electrode PE while a second parasitic capacitance Cpd1 is generated between the pixel electrode PE and the second data line DLm. On the other hand, at a right pixel 120 provided at the right side of the second data line DLm in the liquid crystal cell, a third parasitic capacitance Cdp2 is generated between the second data line DLm and the pixel electrode PE while a fourth parasitic capacitance Cpd2 is generated between the pixel electrode PE and the first data line DLm+1.

Thus, the third parasitic capacitance Cdp2 of the right pixel 120 is at least three times greater than the first parasitic capacitance Cdp1 of the left pixel 110. To this end, a width W2 of the second data line DLm is set to be larger than a width W1 of the first data line DLm−1 within a width range of a black matrix (not shown). Thus, the third parasitic capacitance Cdp2 is at least three times greater than the first parasitic capacitance Cdp1 because a distance between the second data line DLm and the pixel electrode PE is shorter than a distance between the first data line DLm−1 and the pixel electrode PE.

As described above, when the liquid crystal cell is driven by the horizontal 2-dot inversion system, the LCD according to the second embodiment of the present invention allows the third parasitic capacitance Cdp2 at a right pixel 120 of two pixels having the same data polarity pattern to be three times greater than the first parasitic capacitance Cdp1. Accordingly, at a left pixel 110, an effect caused by a capacitance coupling of the first parasitic capacitance Cdp1 is added to an effect caused by a capacitance coupling of the second parasitic capacitance Cpd1. On the other hand, at the right pixel 120, an effect caused by a capacitance coupling of the fourth parasitic capacitance Cpd2 is subtracted from an effect caused by a capacitance coupling of the third parasitic capacitance Cdp2, but an effect caused by the same capacitance coupling as the left pixel 110 only is left because an effect caused by a capacitance coupling of the third parasitic capacitance Cdp2 is relatively large. Thus, a deviation in the pixel voltage of the left pixel 110 and the right pixel 120 in the data polarity pattern is cancelled. Accordingly, the LCD according to the embodiment of the present invention does not generate a vertical dimming phenomenon caused by the parasitic capacitance between the data line and the pixel electrode in the related art.

Figure 9:
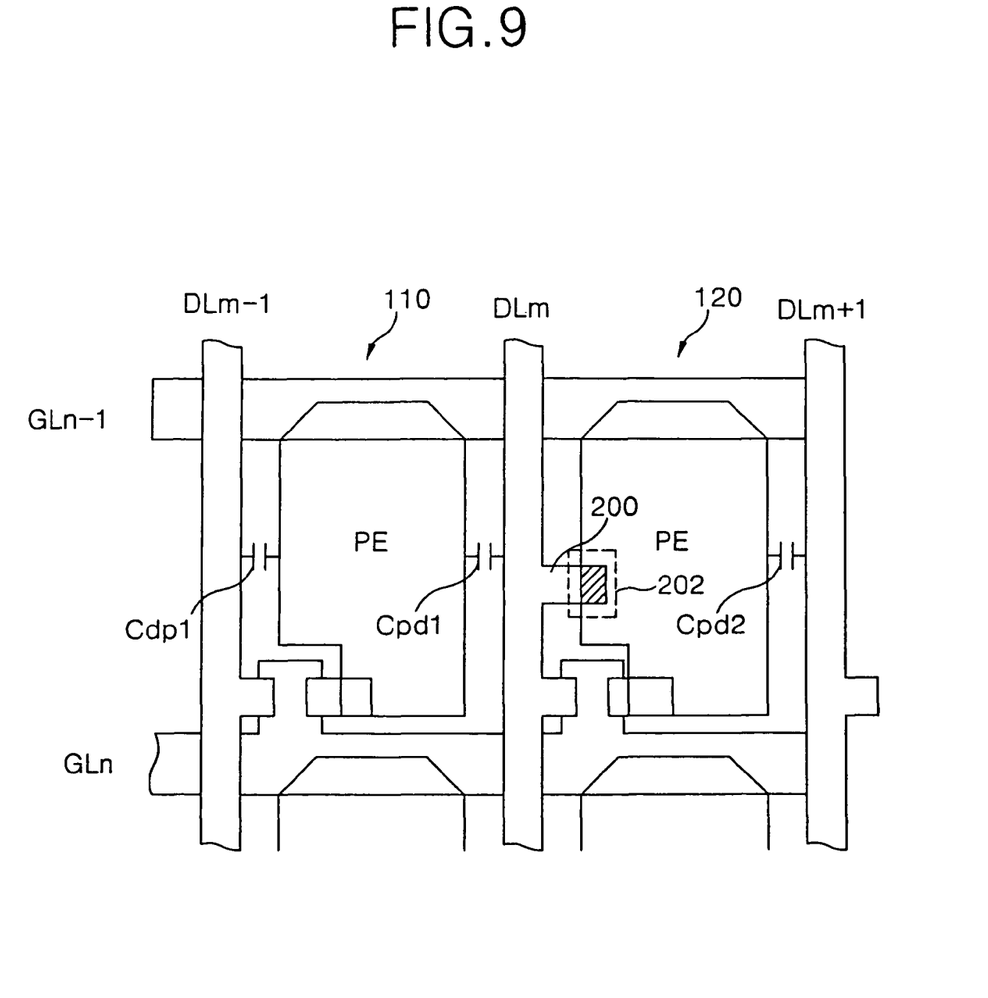
FIG. 9 is a schematic diagram illustrating a liquid crystal cell configuration of a liquid crystal display device according to a third embodiment of the present invention.

Referring to FIG. 9, a liquid crystal cell of a liquid crystal display (LCD) according to a third embodiment of the present invention includes thin film transistors TFT provided at crossings of data lines DL and gate lines GL having a different width from each other, and pixel electrodes PE connected to the thin film transistor TFT. The liquid crystal cell further includes a storage capacitor Cst in order to make a stable maintenance of the charged pixel electrode PE until the next pixel signal is charged.

The thin film transistor TFT has a gate electrode connected to the gate line GL, a source electrode connected to the data line DL and a drain electrode connected to the pixel electrode PE. The thin film transistor TFT is turned on when a scanning signal, that is, a gate high voltage Vgh from the gate line GL is applied, to thereby supply the liquid crystal cell with a pixel signal from the data line DL. Further, the thin film transistor TFT is turned off when a gate low voltage Vgl from the gate line GL is applied, to thereby maintain a pixel signal charged in the liquid crystal cell.

The data lines DL include a first data line DLm−1, and a second data line DLm provided substantially in parallel to the first data line DLm−1 and having a protrusion electrode 200 extending from the pixel electrode PE at one side thereof and overlapping with the pixel electrode PE at a portion thereof. The first and second data lines DLm−1 and DLm are repeatedly provided to have the same distance.

The pixel electrode PE is provided between the data lines DL and connected to the thin film transistor TFT.

At a left pixel 110 provided at the left side around the second data line DLm in the liquid crystal cell, a first parasitic capacitance Cdp1 is generated between the first data line DLm−1 and the pixel electrode PE while a second parasitic capacitance Cpd1 is generated between the pixel electrode PE and the second data line DLm. At a right pixel 120 provided at the right side around the second data line DLm in the liquid crystal cell, a third parasitic capacitance Cdp2 is generated between the second data line DLm and the pixel electrode PE while a fourth parasitic capacitance Cpd2 is generated between the pixel electrode PE and the first data line DLm+1. Further, at the right pixel 120, the pixel electrode PE overlaps with the protrusion electrode 200 of the second data line DLm to thereby generate an additional capacitance 202.

Thus, the third parasitic capacitance Cdp2 and the additional capacitance 202 generated between the second data line DLm and the pixel electrode PE at the right pixel 120 is at least three times greater than the first parasitic capacitance Cdp1. To this end, the protrusion electrode 200 overlaps with the second data line DLm such that a sum of the additional capacitance 202 and the third capacitance Cdp2 is at least three times greater than the first capacitance Cdp1.

As described above, when the liquid crystal cell is driven by the horizontal 2-dot inversion system, the LCD according to the third embodiment of the present invention allows the additional capacitance 202 and the third parasitic capacitance Cdp2 at a right pixel 120, of two pixels having the same data polarity pattern, to be three times greater than the first parasitic capacitance Cdp1. Accordingly, at a left pixel 110, an effect caused by a capacitance coupling of the first parasitic capacitance Cdp1 is added to an effect caused by a capacitance coupling of the second parasitic capacitance Cpd1. On the other hand, at the right pixel 120, an effect caused by a capacitance coupling of the fourth parasitic capacitance Cpd2 is subtracted from an effect caused by a capacitance coupling of the third parasitic capacitance Cdp2 and an effect caused by a capacitance coupling of the additional capacitance 202, but an effect caused by the same capacitance coupling as the left pixel 110 only is left because an effect caused by a capacitance coupling of the third parasitic capacitance Cdp2 is relatively large. Thus, a deviation in the pixel voltage of the left pixel 110 and the right pixel 120 in the data polarity pattern is cancelled. Accordingly, the LCD according to the embodiment of the present invention does not generate a vertical dim phenomenon caused by the parasitic capacitance between the data line and the pixel electrode in the prior art.

Figure 10:
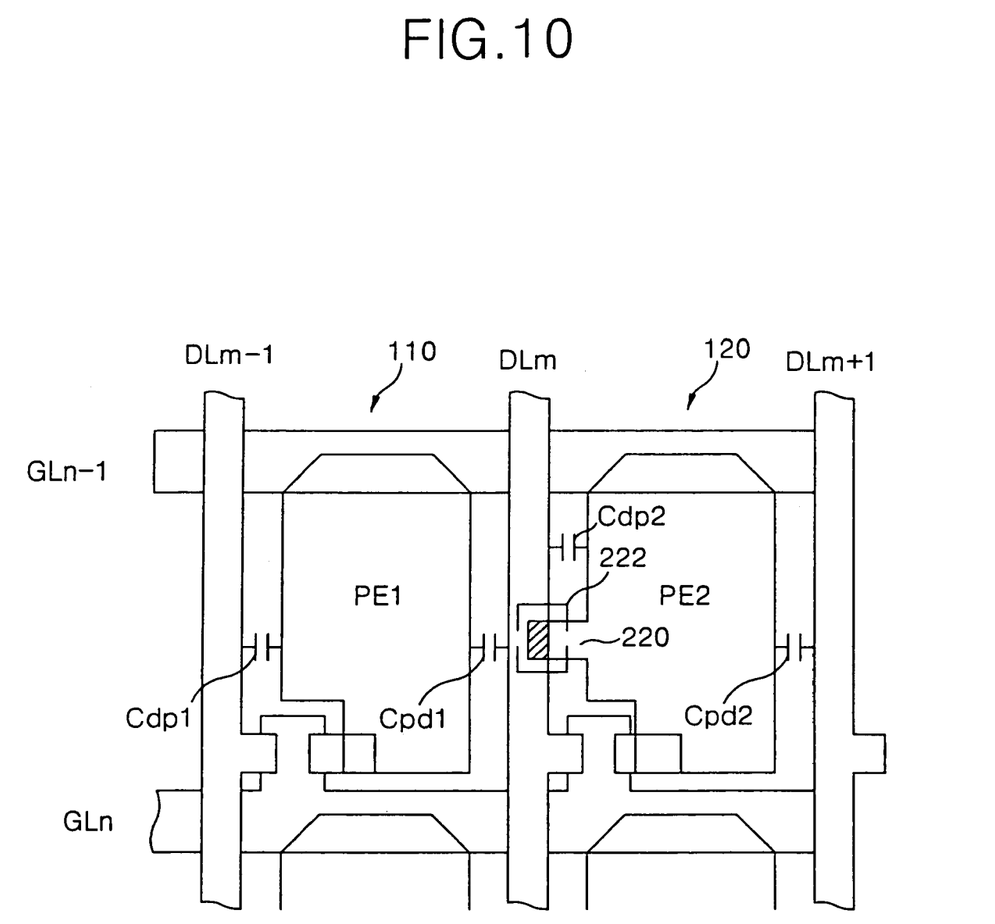
FIG. 10 is a schematic diagram illustrating a liquid crystal cell configuration of a liquid crystal display device according to a fourth embodiment of the present invention.

Referring to FIG. 10, a liquid crystal cell of a liquid crystal display (LCD) according to a fourth embodiment of the present invention includes thin film transistors TFT provided at crossings of data lines DL and gate lines GL, and pixel electrodes PE connected to the thin film transistor TFT. The liquid crystal cell further includes a storage capacitor Cst in order to make a stable maintenance of the charged pixel electrode PE until the next pixel signal is charged.

The thin film transistor TFT has a gate electrode connected to the gate line GL, a source electrode connected to the data line DL and a drain electrode connected to the pixel electrode PE. The thin film transistor TFT is turned on when a scanning signal, that is, a gate high voltage Vgh from the gate line GL is applied, to thereby supply the liquid crystal cell with a pixel signal from the data line DL. Further, the thin film transistor TFT is turned off when a gate low voltage Vgl from the gate line GL is applied, to thereby maintain a pixel signal charged in the liquid crystal cell.

The pixel electrode PE is provided between the data lines DL and connected to the thin film transistor TFT. Such an pixel electrode PE is comprised of a first pixel electrode PE1 connected to the thin film transistor TFT provided at an intersection between the (m−1)th data line DLm−1 and the gate line GL, and a second pixel electrode PE2 connected to the thin film transistor TFT provided at an intersection between the mth data line DLm and the gate line GL. In this case, the first pixel electrode PE1 is arranged at the left side around the mth data line DLm while the second pixel electrode PE2 is arranged at the right side around the mth data line DLm.

The first pixel electrode PE1 is provided between the (m−1)th data line DLm−1 and the mth data line DLm such that a distance between one side thereof and the (m−1)th data line DLm−1 is equal to a distance between other opposite side thereof and the mth data line DLm. In this case, a parasitic capacitance is generated between the data line DL and the pixel electrode PE because they are adjacent to each other for a structure's sake. Such a parasitic capacitance causes a voltage variation in the data line and a capacitance coupling after a pixel signal was charged in the liquid crystal cell, thereby varying a pixel voltage of the liquid crystal cell. The parasitic capacitance is divided into a first parasitic capacitance Cdp1 generated between the (m−1)th data line and the first pixel electrode PE1 and a second parasitic capacitance Cpd1 generated between the first pixel electrode PE1 and the mth data line DLm.

The second pixel electrode PE2 is provided between the mth data line DLm and the (m+1)th data line DLm+1 such that a distance between one side thereof and the mth data line DLm is equal to a distance between other opposite side thereof and the (m+1)th data line DLm+1. In other words, one side of the second pixel electrode PE2 adjacent to the mth data line DLm extends further into the mth data line DLm. In this case, a third parasitic capacitance Cdp2 is generated between the mth data line DLm and the second pixel electrode PE2 while a fourth parasitic capacitance Cpd2 is generated between the second pixel electrode PE2 and the (m+1)th data line DLm+1. Thus, the third parasitic capacitance Cdp2 has at least three times larger value than the first parasitic capacitance Cdp1 of the first pixel electrode PE1. In other words, a distance W2 between one side of the second pixel electrode PE2 and the mth data line DLm becomes narrower than a width W1 between one side of the first pixel electrode PE1 and the (m−1)th data line DLm−1. Thus, the third parasitic capacitance Cdp2 is at least three times greater than the first parasitic capacitance Cdp1. On the other hand, the fourth parasitic capacitance Cpd2 has the same value as the first parasitic capacitance Cdp1.

The liquid crystal cell provided with the first and second pixel electrodes PE1 and PE2 is supplied with a data polarity pattern in the horizontal 2-dot inversion driving system that is changed for each two liquid crystal cells, that is, for each two dots in the horizontal direction while being changed for each one dot in the vertical direction. Accordingly, the first pixel electrode PE1 and the second pixel electrode PE2 are supplied with the same data polarity pattern.

As described above, when the liquid crystal cell is driven by the horizontal 2-dot inversion system, the LCD according to the fourth embodiment of the present invention allows the third parasitic capacitance Cdp2 at a right pixel 120, of two pixels having the same data polarity pattern, to be three times greater than the first parasitic capacitance Cdp1. Accordingly, at a left pixel 110, an affect caused by a capacitance coupling of the first parasitic capacitance Cdp1 is added to an affect caused by a capacitance coupling of the second parasitic capacitance Cpd1. On the other hand, at the right pixel 120, an effect caused by a capacitance coupling of the fourth parasitic capacitance Cpd2 is subtracted from an effect caused by a capacitance coupling of the third parasitic capacitance Cdp2, but an effect caused by the same capacitance coupling as the left pixel 110 only is left because an effect caused by a capacitance coupling of the third parasitic capacitance Cdp2 is relatively large. Thus, a deviation in the pixel voltage of the left pixel 110 and the right pixel 120 in the data polarity pattern is cancelled. Accordingly, the LCD according to the embodiment of the present invention does not generate a vertical dimming phenomenon caused by the parasitic capacitance between the data line and the pixel electrode in the prior art.

The second pixel electrode PE2 of the first and second pixel electrodes PE1 and PE2 includes a protrusion electrode 220 that extends toward the mth data line DLm at the side surface thereof to overlap with a portion thereof.

At a left pixel 110 provided at the left side around the second data line DLm in the liquid crystal cell, a first parasitic capacitance Cdp1 is generated between the (m−1)th data line DLm−1 and the first pixel electrode PE1 while a second parasitic capacitance Cpd1 is generated between the first pixel electrode PE1 and the mth data line DLm. On the other hand, at a right pixel 120 provided at the right side around the mth data line DLm in the liquid crystal cell, a third parasitic capacitance Cdp2 is generated between the mth data line DLm and the second pixel electrode PE2 while a fourth parasitic capacitance Cpd2 is generated between the second pixel electrode PE2 and the (m+1)th data line DLm+1. Further, at the right pixel 120, the second pixel electrode PE2 overlaps with the protrusion electrode 220 of the mth data line DLm to thereby generate an additional capacitance 222.

Thus, the third parasitic capacitance Cdp2 and the additional capacitance 222 generated between the mth data line DLm and the second pixel electrode PE2 at the right pixel 120 is at least three times greater than the first parasitic capacitance Cdp1. To this end, the protrusion electrode 220 overlaps with the mth data line DLm such that a sum of the additional capacitance 222 and the third parasitic capacitance Cdp2 is at least three times greater than the first capacitance Cdp1.

As described above, when the liquid crystal cell is driven by the horizontal 2-dot inversion system, the LCD according to the fourth embodiment of the present invention allows third parasitic capacitance Cdp2 at a right pixel 120 of two pixels having the same data polarity pattern to be three times greater than the first parasitic capacitance Cdp1. Accordingly, at a left pixel 110, an effect caused by a capacitance coupling of the first parasitic capacitance Cdp1 is added to an effect caused by a capacitance coupling of the second parasitic capacitance Cpd1. On the other hand, at the right pixel 120, an effect caused by a capacitance coupling of the fourth parasitic capacitance Cpd2 is subtracted from an effect caused by a capacitance coupling of the third parasitic capacitance Cdp2 and an affect caused by a capacitance coupling of the additional capacitance 222, but an effect caused by the same capacitance coupling as the left pixel 110 only is left because an effect caused by a capacitance coupling of the third parasitic capacitance Cdp2 is relatively large. Thus, a deviation in the pixel voltage of the left pixel 110 and the right pixel 120 in the data polarity pattern is cancelled. Accordingly, the LCD according to the embodiment of the present invention does not generate a vertical dimming phenomenon caused by the parasitic capacitance between the data line and the pixel electrode in the prior art.

As described above, the LCD according to the present invention includes the pixel electrode set such that parasitic capacitance values between the data lines are asymmetrical to each other. Further, the LCD according to the present invention includes the data lines having a different width from each other such that parasitic capacitance values between the data lines are asymmetrical to each other. Alternatively, the LCD according to the present invention includes the pixel electrode protruded toward the data line to overlap with a portion thereof such that parasitic capacitance values between the data lines are asymmetrical to each other. Otherwise, the LCD according to the present invention includes the data line protruded toward the pixel to overlap with a portion thereof such that parasitic capacitance values between the data lines are asymmetrical to each other.

Accordingly, the LCD according to the present invention does not generate a vertical dimming phenomenon caused by the parasitic capacitance between the data line and the pixel in the horizontal 2-dot inversion system. As a result, the LCD according to the present invention can improve a picture quality of the liquid crystal display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a first data line supplied with data;
    a second data line supplied with said data and having a different width from the first data line;
    a first pixel electrode spaced at a desired distance from the first data line; and
    a second pixel electrode spaced at a desired distance from the second data line and spaced apart from the second data line by a distance different from said distance between the first data line and the first pixel electrode,
    wherein a parasitic capacitance between the second pixel electrode and the second data line has at least three times larger value than a parasitic capacitance between the first pixel electrode and the first data line.

2. The liquid crystal display device according to claim 1, wherein the first pixel electrode and the second pixel electrode have a different size from each other.

3. The liquid crystal display device according to claim 1, wherein the first and second pixel electrodes are supplied with data having the same polarity.

4. The liquid crystal display device according to claim 1, wherein said data have data polarity patterns inverted for each two pixel electrodes in the horizontal direction while having data polarity patterns inverted for each one pixel electrode in the vertical direction.

5. A liquid crystal display device, comprising:
    a first data line supplied with a signal;
    a second data line supplied with said signal and parallel to the first data line;
    a protrusion electrode protruding from the second data line;
    a first pixel electrode spaced at a desired distance from the first data line; and
    a second pixel electrode spaced at a desired distance from the second data line and overlapped with the protrusion electrode at a portion thereof so that parasitic capacitance between the second pixel electrode and the second data line has at least three times larger value than a parasitic capacitance between the first pixel electrode and the first data line.

6. The liquid crystal display device according to claim 5, wherein the first pixel electrode has the same dimension as the second pixel electrode.

7. The liquid crystal display device according to claim 5, wherein the first and second pixel electrodes are supplied with signals having the same polarity.

8. The liquid crystal display device according to claim 5, wherein said signals have polarity inverted for each two pixel electrodes in the horizontal direction while having polarity inverted for each one pixel electrode in the vertical direction.

9. A liquid crystal display device, comprising:
    first and second data lines supplied with signals;
    a first pixel electrode spaced at a predetermined distance from the first data line;
    a second pixel electrode spaced at a second predetermined distance from the second data line; and a protrusion electrode protruded from the second pixel electrode into the second data line and overlapped with the second data line at a portion thereof so that parasitic capacitance between the second pixel electrode and the second data line has at least three times larger value than a parasitic capacitance between the first pixel electrode and the first data line.

10. The liquid crystal display device according to claim 9, wherein the first pixel electrode has the same dimension as the second pixel electrode.

11. The liquid crystal display device according to claim 9, wherein the first and second pixel electrodes are supplied with signals having the same polarity.

12. The liquid crystal display device according to claim 9, wherein said signals have polarity inverted for each two pixel electrodes in the horizontal direction while having polarity inverted for each one pixel electrode in the vertical direction.

* * * * *